US009632770B2

(12) United States Patent
Harrison et al.

(10) Patent No.: US 9,632,770 B2
(45) Date of Patent: Apr. 25, 2017

(54) INFRASTRUCTURE FOR HOSTING AND PUBLISHING SOFTWARE PACKAGES

(71) Applicant: GOOGLE INC., Mountain View, CA (US)

(72) Inventors: Ryan James Harrison, Kitchener (CA); Divam Jain, Kitchener (CA); Wesley Tarle, Waterloo (CA); Benoit St-Pierre, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/849,375

(22) Filed: Sep. 9, 2015

(65) Prior Publication Data

US 2016/0321067 A1    Nov. 3, 2016

Related U.S. Application Data

(60) Provisional application No. 62/153,745, filed on Apr. 28, 2015.

(51) Int. Cl.
*G06F 9/44*  (2006.01)
*G06F 9/445*  (2006.01)
*G06F 11/36*  (2006.01)

(52) U.S. Cl.
CPC ............. *G06F 8/71* (2013.01); *G06F 8/60* (2013.01); *G06F 11/3604* (2013.01)

(58) Field of Classification Search
None
See application file for complete search history.

(56) References Cited

U.S. PATENT DOCUMENTS

2015/0025925 A1\* 1/2015 Moore et al. ............... 705/7.11

OTHER PUBLICATIONS

International Search Report and Written Opinion issued in corresponding application PCT/US2016/028632 on Dec. 9, 2016.

\* cited by examiner

*Primary Examiner* — Chuck Kendall
(74) *Attorney, Agent, or Firm* — McDermott Will & Emery LLP

(57) ABSTRACT

A system and method for hosting and publishing software packages is disclosed. An example method includes receiving and storing artifacts related to a software development kit and metadata describing a version of the software development kit. The received artifacts and metadata may be converted into a package for the software development kit. The package may then be staged and the package's dependencies may be checked to ensure that the package's dependencies exist and that there are no conflicts with another staged package. The currently staged packages may then be tested to determine if there are any incompatibilities among the staged packages and access control information may be used to provide the currently staged packages in a common format to the appropriate users.

20 Claims, 5 Drawing Sheets

INFRASTRUCTURE FOR HOSTING AND PUBLISHING SOFTWARE PACKAGES

CROSS REFERENCE TO RELATED APPLICATIONS

This non-provisional application claims the benefit under 35 U.S.C. §119(e) to U.S. Provisional Application No. 62/153,745, filed on Apr. 28, 2015, all of which are hereby expressly incorporated by reference into the present application.

PRIORITY STATEMENT

This application is a continuation of Application No. 62/153,745 filed on Apr. 28, 2015, and for which priority is claimed under 35 U.S.C. §120. The entire contents of the identified application are hereby incorporated by reference.

BACKGROUND

In recent years, software engineers have focused on building applications on a variety of platforms for example iOS, Android, Windows Phone, BlackBerry, and Firefox OS. These applications often use software development kits (SDKs) that provide users with access to data and functionality such as maps, email, news, and social networking information. A software development kit (SDK) may include a set of software development tools, libraries, documentation, header files, and samples that can be used to develop applications for a certain development platform with specific functionality that is specified in the SDK. SDKs may include application programming interfaces (APIs) so that software developers can have controlled access to methods and data from other applications or services, such as web services.

For example, an SDK provider may create a mapping service and provide a Map API for software developers to access the mapping service's functionality. The Map SDK may include sample code, libraries, and documentation on how the map functionality should be used. The Map API may contain information about the mapping service including methods to obtain: directions to a location, the travel distance between locations, the travel time between locations, and a location's elevation. If a software developer is building an application for a fast food restaurant, the developer may want to use the Map API to allow a user to request directions to the restaurant from the user's current location. The developer does not have to write the map-specific code to obtain directions, but can instead use the Map API to access the mapping web service's functionality and obtain directions.

Customarily, each SDK development team has an entirely independent end-to-end release process from other SDK development teams. These separate release processes may lead to several problems. For example, individual SDKs may be provided in different formats which lead to inconsistent packaging structures and components being available to developers. Developers then have to understand how to handle each particular format. Another problem is minimal, if any compatibility testing among SDKs. Since each SDK development team releases its own SDK, each team only tests its own SDK, without considering other SDKs that may be used on the same development platform. The lack of testing among SDKs may create binary incompatibilities among produced SDKs since SDKs may depend on the same dependency, but use different versions of the dependency. Another problem is that currently there is no way to provide consistent documentation about an SDK including how to use a specific SDK in a development project. Additionally, there is no coordination of external messaging among released SDKs for a particular software platform.

As recognized by the inventors, there should be an automated system that provides an end-to-end release process for SDKs so that SDKs can be released in conjunction with other SDKs.

SUMMARY

This specification describes technologies relating to hosting and publishing software packages.

In general, aspects of the subject matter described in this specification can be embodied in a computer-implemented method and systems. An example system includes one or more processing devices and one or more storage devices storing instructions that, when executed by the one or more processing devices, cause the one or more processing devices to implement an example method. An example method includes: receiving and storing artifacts related to a software development kit and metadata describing a version of the software development kit; converting the received artifacts and metadata into a package for the software development kit; staging the package and checking all of the package's dependencies to ensure that the package's dependencies exist and that there are no conflicts with another staged package; testing the currently staged packages to determine if there are any incompatibilities among the staged packages; and using access control information to provide the currently staged packages in a common format to the appropriate users.

Another example system for hosting and publishing software packages includes: an SDK host that receives and stores artifacts related to a software development kit and metadata describing a version of the software development kit; a converter that converts the received artifacts and metadata into a package for the software development kit; a staging host that stages the package and checks all of the package's dependencies to ensure that the package's dependencies exist and that there are no conflicts with another staged package; a tester that fetches the currently staged packaged and tests them to determine if there are any incompatibilities among the staged packages; and a package host that receives the currently staged packages from the tester and uses access control information to provide the currently staged packages from the tester and uses access control information to provide the currently staged packages in a common format to the appropriate users.

These and other embodiments can optionally include one or more of the following features. Artifacts may include: change logs, license files, resources, media files, sample projects, source files, compiled binaries, libraries, or other information related to a particular SDK. Artifacts may be received in a compressed format. Metadata may include: the name of the SDK, versioning information, SDK dependencies, descriptions of what an SDK does, the authors of an SDK, contact information for an SDK's author(s), licensing information, the official website for an SDK, SDK platform requirements, screenshots, commands to run before integrating the SDK, deprecation information, compilation and project settings, or other details of the SDK. Metadata may be received in JSON, YAML, XML, or custom domain specific language format. Metadata may be received by tags in a public-facing source control management system and static .zip files served over HTTP. Artifacts and metadata may only be stored for supported versions of an SDK. A conversion process may be triggered on a condition such as an explicit signal from the SDK provider, a poll of the state of the SDK host, or receiving a signal regarding a change from the SDK host. A command line tool or other way of interacting may allow SDK providers to signal that a specific SDK and version is present and ready for testing.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

According to an example embodiment, there may be a system for hosting and publishing software development kits that resolves conflicts among SDKs and provides the SDKs in a common output format on a single host site for developers to use.

An example automated system may allow developers to obtain SDKs for a particular software platform in a single place and in a common format. The example system may test the SDKs for compatibility with other SDKs that will be deployed on the platform and provide the SDKs in a common format that includes a consistent packaging structure and provides consistent components for developers to use in their applications.

Figure 1:
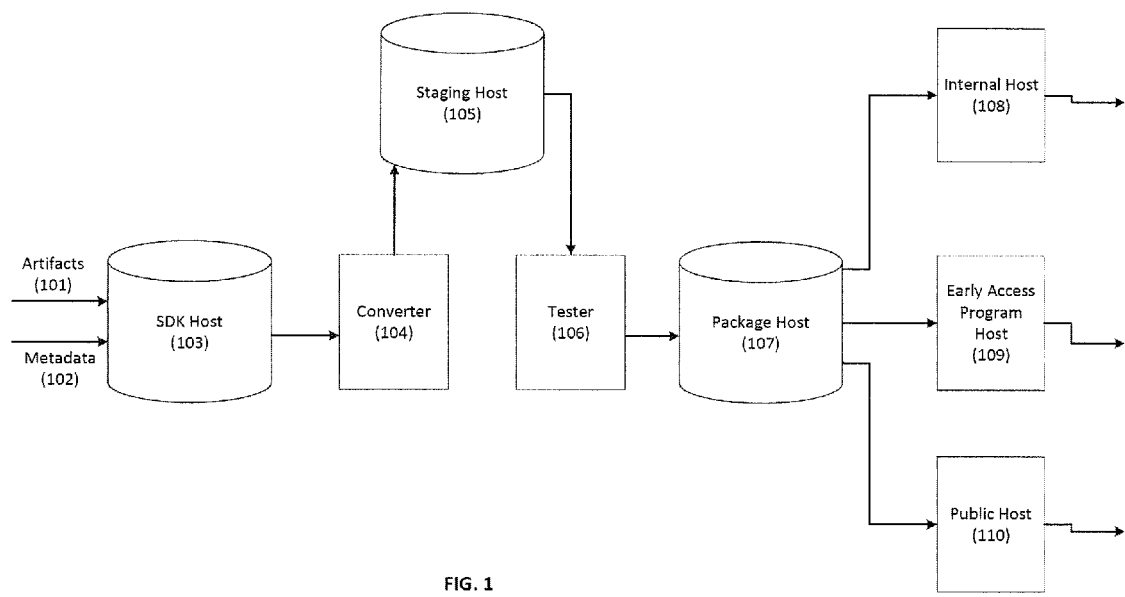
FIG. 1 is a block diagram illustrating an example system for hosting and publishing software development kits.
Figure 2:
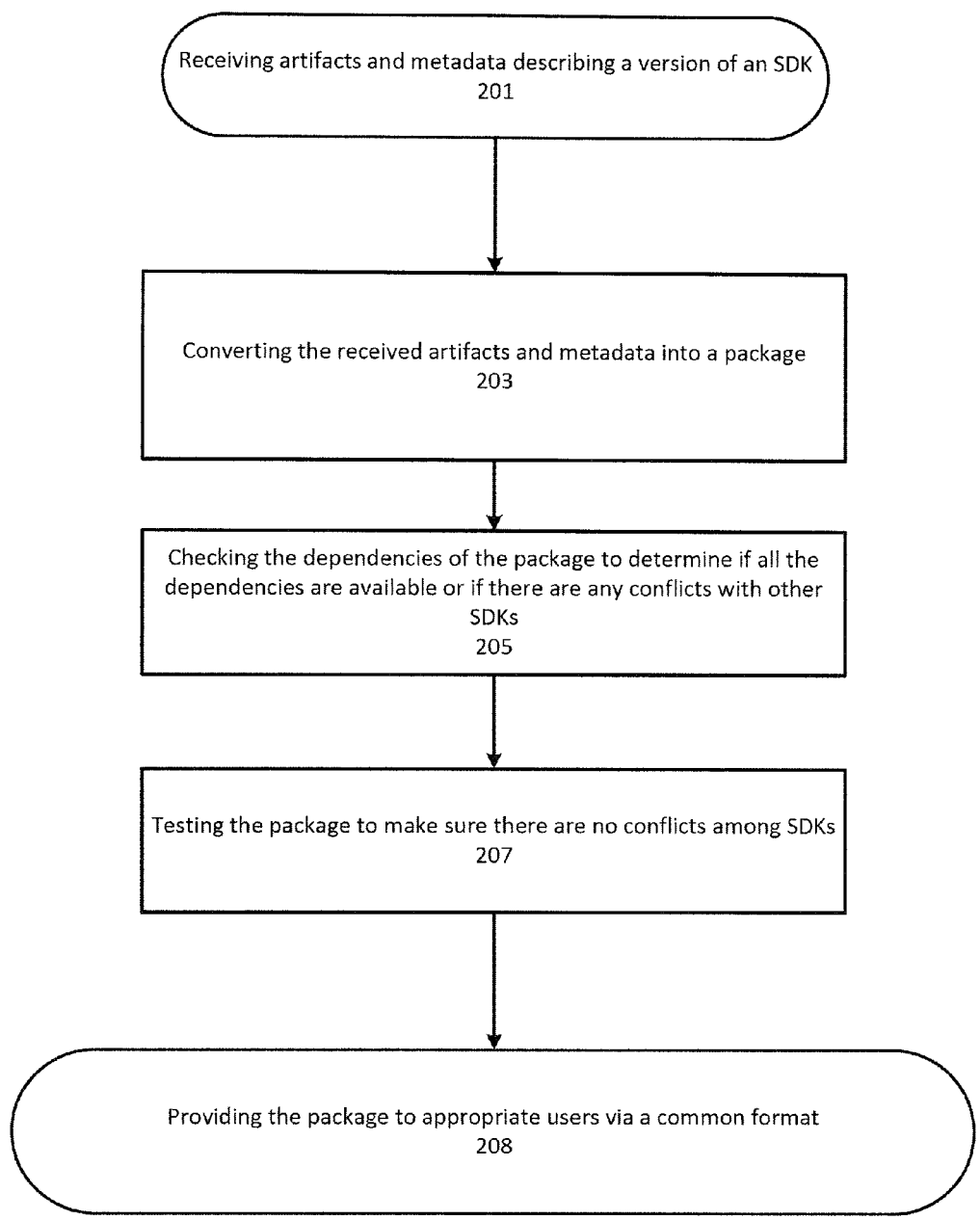
FIG. 2 is a flow diagram illustrating an example method for hosting and publishing software development kits.

An example system may provide several SDKs from a single site which hosts all SDKs that are available. An example system as shown in FIG. 1 may take in information from an SDK provider including artifacts (101) and metadata (102) related to a particular SDK and convert the provided information into a format that is consumable by users. In some embodiments, example artifacts may include information related to a particular SDK such as change logs, license files, resources, media files, sample projects, source files, and compiled binaries and libraries which may be in a compressed format like a .zip file. Example metadata may include the name of the SDK, versioning information, SDK dependencies, descriptions of what an SDK does, the authors of an SDK, contact information for an SDK's authors, licensing information, the official website for an SDK, SDK platform requirements (such as operating system version and CPU architecture), screenshots, commands to run before integrating the SDK, deprecation information, compilation and project settings, and other details of the SDK. This information may be provided by SDK providers to the example system in many different formats including: JSON, YAML, XML, or a custom domain specific language (DSL) There may be a variety of methods for sending these files to an example system including tags in public-facing source control management systems and static .zip files served over HTTP.

An example system may receive artifacts (101) and metadata (102) describing a version of an SDK and store this information in a general data store, the SDK Host (103). This SDK Host (103) may hold each version of each received and supported SDK. Versions may be kept indefinitely. In one embodiment, an example system may have the concept of "supported versions" of packages. Supported versions are versions of an SDK that the SDK developers actively support. SDKs may update their metadata to indicate that they are deprecated without replacement or deprecated in favor of another SDK that is named. Once the developers no longer support a version, an example system may remove packages for the unsupported SDKs. The system may then send the information to a converter (104) where the received information is converted into a package with the necessary tools for the development process. An example converter (104) may use the received artifacts (101) and metadata (102) to understand how to package a version of a particular SDK. For example, one of the artifacts may be a build file that describes all the necessary components of the SDK and the order in which specific files should be added to a package.

Figure 4:
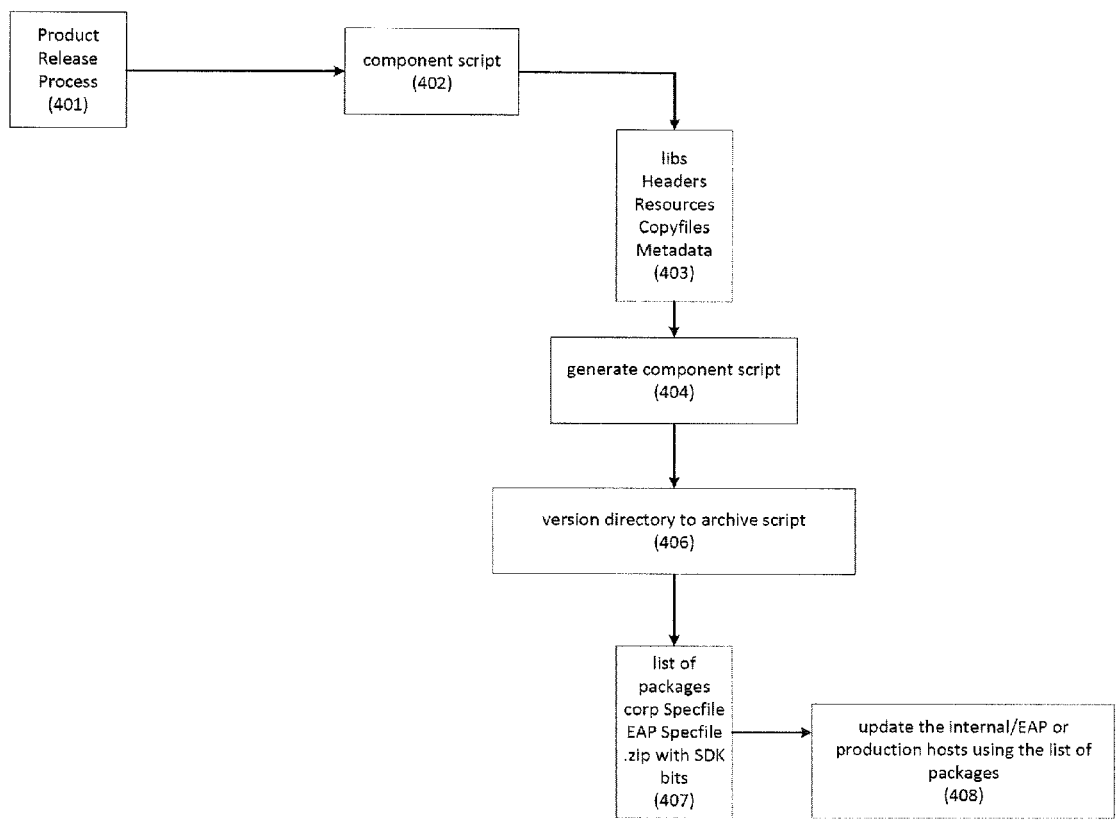
FIG. 4 is a block diagram illustrating an example system for generating SDKs.

In one example, all necessary files and configurations may be described in a script as shown in FIG. 4. This component script (402) may take all files that are part of an SDK release and place them in a standard folder hierarchy. The script may use a standard configuration file, such as a JSON file, to list all of the necessary files and build configurations. The following keys may be necessary to build a version of an SDK: name, public name, version, summary, description, and homepage. Name may be the name of the component that will be the root name of the hierarchy. Public name may be the public name that the example system will use to display the SDK to users. Version may be the version of the SDK that is being built. Summary maybe a short description of the SDK that is being built. Description may be a longer description of the SDK. Homepage may be the website URL of the SDK with project information and documentation.

An additional script (404) may generate new build configurations for the new components (403) and updating a tag for the new SDK version. This script (404) may use the configuration stored in the build files/configurations in the new component files (403) to generate the appropriate metadata and build rules. Another script (406) may take a version directory and compile it into an archive file, for example a Cocoapod zip file for dissemination (407). An example converter (104) may be triggered on a variety of conditions including an explicit signal from the SDK provider, a poll of the state of the SDK Host (103), or receiving a signal regarding a change from the SDK Host (103). Data in the SDK host may be in a structured format that allows for quick checking of the SDK and version combinations. In an example system, this format may be a directory structure in source control of the format SDK/Version. When polling, a list may be generated of SDK and Version pairs. This list may be compared to the set of pairs that have already been converted to determine the SDK/Versions that should be converted. In other embodiments, an example system may convert everything in the SDK host on a certain schedule.

Once the conversion of a particular version of an SDK has been completed, the package may be pushed to a Staging Host (105). Dependencies may be checked at this stage. An example system checks to make sure that all dependencies exist and that the right versions of the dependencies are available. If the dependencies do not exist or the right version is unavailable, the package remains in the Staging Host (105) until the dependencies are available and corrected. Conflicts among SDKs may also be resolved at this stage. Multiple SDKs may potentially be staged, although dependencies may be staged first. Conflict resolution may be a manual process at this stage since it is most likely due to a semantic issue that may not be able to be fixed programmatically. An example system may notify the owners of the conflicting SDKs with as much information about the issue as possible.

A tester (106) may be used for propagating packages from the Staging Host (105) to the Package Host (107). In an example system, a tester (106) may fetch the currently staged packages and test them. This tester (106) may be triggered by the converter (104), the Staging Host (105), an SDK provider, or via a polling mechanism. In some embodiments, when a conversion is completed the location of the new package in the Staging Host is sent to the tester either by the converter (104) or the Staging Host (105). In other embodiments, there may be a command line tool or other way to interact that allows SDK providers to signal to the tester (106) that a specific SDK and version is present in the Staging Host and needs testing. Testing may involve building an application with staged packages and the relevant available packages to make sure there are no build issues. The service may also support running more sophisticated integration tests, i.e. making sure that application functionality that depends on different SDKs works. An example system may provide a componentized set of tests. There may be presubmit checks, integration tests, prepackaging deployments to hosting infrastructure instances that serve source archives and files[ ], and validations for build rules. When an SDK version is created or updated, the configuration script may be validated to ensure that it may contain valid parameters with the following properties: correct public names, dependencies that are correctly declared; summaries that are shorter than the description; a specified minimum platform version; and a valid homepage. Additionally, the libraries may be validated for specific architectures. Changes to the environment specifications for an SDK may be checked to verify that the updated environment specification is deployable and validated. For example, validation may include a presubmit check to guarantee that all the specified packages of files that are versioned, stored, and accessed from the example system exist, verify that the collection of the specified packages of files contain a valid/consistent collection, and a test deployment may be performed to a local machine in order to determine that the SDK will deploy. After an SDK has been successfully deployed, continuous integration tests may be set up and run with sample projects and interoperability tests to determine compatibility among SDKs being deployed to the same development platform. Once a package has been tested it may be pushed to the Package Host (107). Access control information may be provided that controls how the package should be accessible. The Package Host (107) may be provided this access control information so that the Package Host (107) can provide packages to the appropriate users. Access control information may be provided as part of the metadata or may be signaled by the SDK provider. In one embodiment, different locations within the hosting infrastructure may determine the access control list (ACL) for a package. There may be tools provided for the SDK provider to push a package to the correct location for specific ACLs. For example, access control rules may be implemented that use IP addresses to determine if a user or application can access a specific SDK. There may be private, semi-private, and externally accessible packages. As illustrated in FIG. 1, internally hosted packages (108) may be private, early access program hosted packages (109) may be semi-private, and publically hosted packages (110) may be externally accessible by public users. A package that may be pushed to additional users/applications may be cached in the Staging Host so that it does not need to be re-converted into a package at a later time.

As discussed above, packages may be provided in a common format such as CocoaPods, as supported zip files as illustrated in FIG. 4 for example (407). CocoaPods are library distribution and dependency resolution mechanisms that have become popular recently in the iOS development community. These mechanisms allow for a simplified automated workflow for fetching libraries and their dependencies. They also enforce semantic versioning of libraries. A developer using Cocoa Pods lists the libraries that they want to directly use and related versioning information in a Podfile. This file may be used by the CocoaPod tools to fetch the libraries and their dependencies.

In some embodiments, there may not be a Staging Host. Dependency resolution may be done in the SDK Host. Also, SDKs may be batched as a release. If SDKs are batched, dependency checking may not need to be done in the Converter or the Tester. Providers may be responsible for only pushing sets of new SDKs that have correct dependencies. Using batching, an example system may avoid having packages sitting in the Staging Host waiting for their dependencies. Instead, packages must either already have their dependencies embedded, or be batched with their dependencies. This requirement may simplify some of the logic in an example system.

An example method for hosting and publishing software packages begins with receiving artifacts and metadata describing a version of an SDK (201). The received artifacts and metadata may then be converted into a package (203). The package's dependencies may be checked to see if all the dependencies are available or if there are any conflicts with other SDKs. (205). Then, the package may be tested to ensure that there are no conflicts, i.e. build conflicts, among the SDKs. (207). The package may then be provided to the appropriate users via a common format. (208) The appropriate users may be determined by checking access control rules associated with the SDK.

Figure 5A:
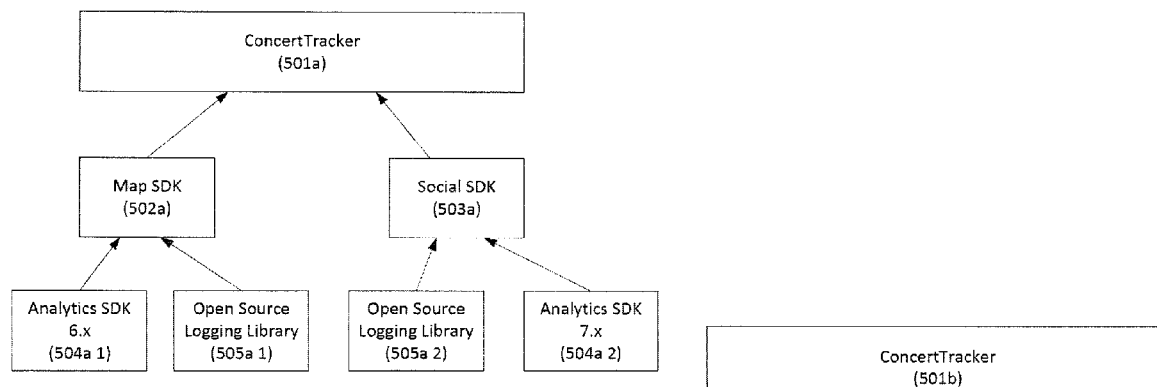
FIG. 5*a* is a block diagram illustrating an example of SDK dependencies.
Figure 5B:
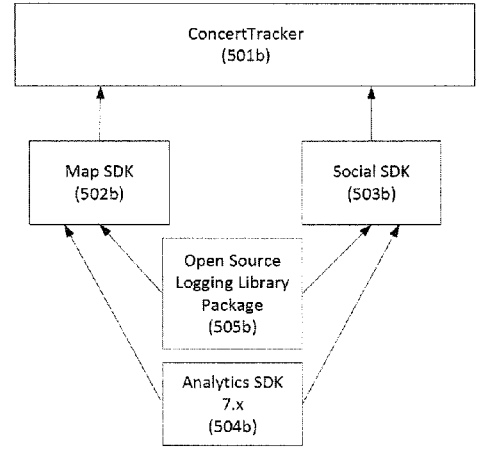
FIG. 5*b* is a block diagram illustrating an example of SDK dependencies.

An example system may have many useful purposes. For example as shown in FIG. 5a, there may be an application that allows users to make a record of where they have had interactions with people, like a concert. The application may be called ConcertTracker (501a) and need access to a Map SDK (502a) and a social SDK (503a) for getting location information and information about a user's friends. ConcertTracker (501a) may also let a user share information with the user's friends using the social SDK (503a). These SDKs (502a, 503a) may both depend on a third SDK (504a 1, 504a 2) that allows reporting analytics information. If the Map SDK (502a) currently uses the 6.x (504a 1) version of the Analytics SDK and the social SDK (503a) uses the 7.x (504a 2) version of the Analytics SDK, then there may not be a common version of the SDK that supplies the APIs needed for both. Additionally, both SDKs (502a, 503a) may use the same open source library (505a 1, 505a 2) for logging information for the developer, such as when an application crashes. If the library is compiled into each SDK without the symbols being renamed then building an application depending on the Map SDK (502a) and the social SDK (503a) will fail due to duplicate symbols. To fix this problem, as shown in FIG. 5b, an example system may create a package that contain the library (505b) and have both the Map SDK (502b) and the social SDK (503b) depend on the created package so that a dependency manager only pulls in one copy of the open source library (505b).

Figure 3:
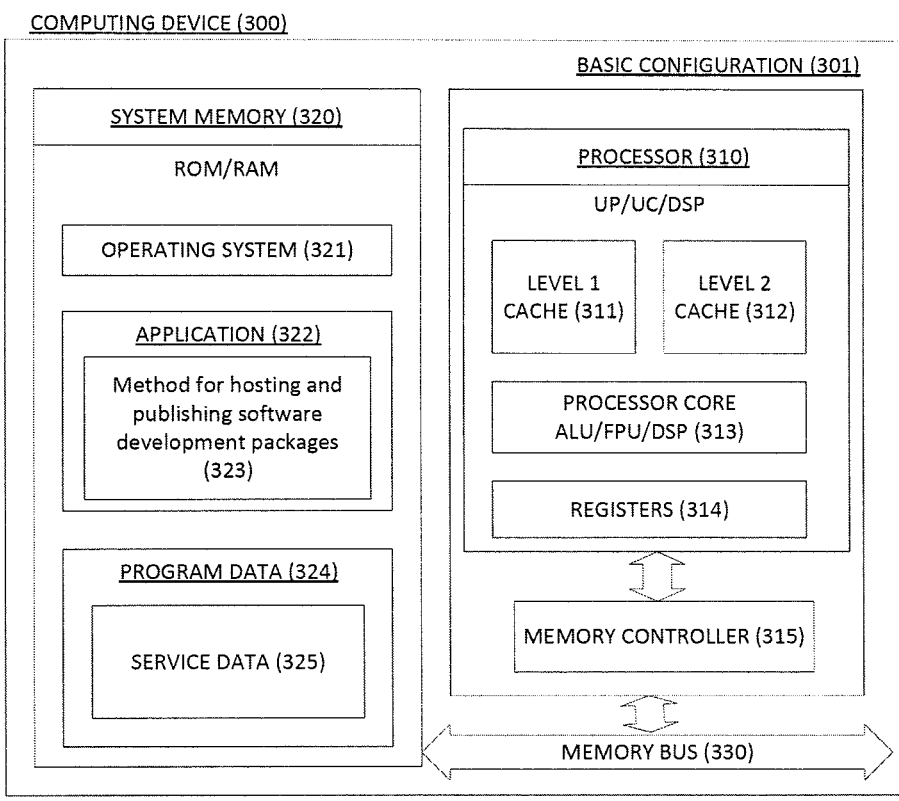
FIG. 3 is a block diagram illustrating an example computing device.

FIG. 3 is a high-level block diagram of an example computer (300) that is arranged for hosting and publishing software packages. In a very basic configuration (301), the computing device (300) typically includes one or more processors (310) and system memory (320). A memory bus (330) can be used for communicating between the processor (310) and the system memory (320).

Depending on the desired configuration, the processor (310) can be of any type including but not limited to a microprocessor (µP), a microcontroller (µC), a digital signal processor (DSP), or any combination thereof. The processor (310) can include one more levels of caching, such as a level one cache (311) and a level two cache (312), a processor core (313), and registers (314). The processor core (313) can include an arithmetic logic unit (ALU), a floating point unit (FPU), a digital signal processing core (DSP Core), or any combination thereof. A memory controller (316) can also be used with the processor (310), or in some implementations the memory controller (315) can be an internal part of the processor (310).

Depending on the desired configuration, the system memory (320) can be of any type including but not limited to volatile memory (such as RAM), non-volatile memory (such as ROM, flash memory, etc.) or any combination thereof. System memory (320) typically includes an operating system (321), one or more applications (322), and program data (324). The application (322) may include a method for hosting and publishing software packages. Program Data (324) includes storing instructions that, when executed by the one or more processing devices, implement a method for hosting and publishing software packages. (323). In some embodiments, the application (322) can be arranged to operate with program data (324) on an operating system (321).

The computing device (300) can have additional features or functionality, and additional interfaces to facilitate communications between the basic configuration (301) and any required devices and interfaces.

System memory (320) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media can be part of the device (300).

The computing device (300) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (300) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for hosting and publishing software packages, the system comprising:
   an SDK host that receives and stores artifacts related to a software development kit and metadata describing a version of the software development kit;
   a converter that converts the received artifacts and metadata into a package for the related software development kit;
   a staging host that stages the package and checks all of the package's dependencies to ensure that the package's dependencies exist and that there are no dependency conflicts with another staged package, which uses the same dependency as the package;
   a tester that fetches the currently staged packages and tests them to determine if there are any incompatibilities among the staged packages; and
   a package host that receives the currently staged packages from the tester and uses access control information to determine which IP address within the hosting infrastructure to provide the currently staged packages in a common format, where different IP addresses within the hosting infrastructure determine the access control list (ACL) for a package.

2. The system of claim 1, wherein artifacts include: change logs, license files, resources, media files, sample projects, source files, compiled binaries, libraries, or other information related to a particular SDK.

3. The system of claim 1 further comprising receiving artifacts in a compressed format.

4. The system of claim 1, wherein metadata includes: the name of the SDK, versioning information, SDK dependencies, descriptions of what an SDK does, the authors of an SDK, contact information for an SDK's author(s), licensing information, the official website for an SDK, SDK platform requirements, screenshots, commands to run before integrating the SDK, deprecation information, compilation and project settings, or other details of the SDK.

5. The system of claim 1, further comprising receiving metadata in JSON, YAML, XML, or custom domain specific language format.

6. The system of claim 1, further comprising receiving metadata by tags in a public-facing source control management system and static .zip files served over HTTP.

7. The system of claim 1, further comprising the SDK host only storing artifacts and metadata for supported versions of an SDK.

8. The system of claim 1, further comprising the converter being triggered on a condition.

9. The system of claim 8, wherein a condition is an explicit signal from the SDK provider, a poll of the state of the SDK host, or receiving a signal regarding a change from the SDK host.

10. The system of claim 1, further comprising a command line tool or other way of interacting that allows SDK providers to signal to the tester that a specific SDK and version is present in the staging host and is ready for testing.

11. A computer-implemented method for hosting and publishing software packages, the method comprising:
    receiving and storing artifacts related to a software development kit and metadata describing a version of the software development kit;
    converting the received artifacts and metadata into a package for the related software development kit;
    staging the package and checking all of the package's dependencies to ensure that the package's dependencies exist and that there are no dependency conflicts with another staged package, which uses the same dependency as the package;
    testing the currently staged packages to determine if there are any incompatibilities among the staged packages; and
    using access control information to determine which IP address within the hosting infrastructure to provide the currently staged packages in a common format, where different IP addresses within the hosting infrastructure determine the access control list (ACL) for a package.

12. The method of claim 11, wherein artifacts include: change logs, license files, resources, media files, sample projects, source files, compiled binaries, libraries, or other information related to a particular SDK.

13. The method of claim 11 further comprising receiving artifacts in a compressed format.

14. The method of claim 11, wherein metadata includes: the name of the SDK, versioning information, SDK dependencies, descriptions of what an SDK does, the authors of an SDK, contact information for an SDK's author(s), licensing information, the official website for an SDK, SDK platform requirements, screenshots, commands to run before integrating the SDK, deprecation information, compilation and project settings, or other details of the SDK.

15. The method of claim 11, further comprising receiving metadata in JSON, YAML, XML, or custom domain specific language format.

16. The method of claim 11, further comprising receiving metadata by tags in a public-facing source control management system and static .zip files served over HTTP.

17. The method of claim 11, further comprising only storing artifacts and metadata for supported versions of an SDK.

18. The method of claim 11, further comprising triggering the converting process on a condition.

19. The method of claim 18, wherein a condition is an explicit signal from the SDK provider.

20. The method of claim 11, further comprising a command line tool or other way of interacting that allows SDK providers to signal that a specific SDK and version is ready for testing.

* * * * *